United States Patent [19]

Myslinski et al.

[11] Patent Number: 4,582,959
[45] Date of Patent: Apr. 15, 1986

[54] MESSAGE WAITING ALERTING METHOD

[75] Inventors: Theodore A. Myslinski, Freehold, N.J.; Paul L. Richman, Boulder, Colo.

[73] Assignee: AT&T Information Systems Inc., Holmdel, N.J.

[21] Appl. No.: 617,325

[22] Filed: Jun. 5, 1984

[51] Int. Cl.⁴ .............................................. H04M 3/50
[52] U.S. Cl. .............................. 179/27 FH; 179/84 C
[58] Field of Search ........... 179/27 FH, 18 B, 18 BG, 179/84 C, 18 AD

[56] References Cited

U.S. PATENT DOCUMENTS

4,375,582 3/1983 Gist et al. .................... 179/27 FH
4,438,506 3/1984 Strom ............................... 364/900

Primary Examiner—Thomas W. Brown
Attorney, Agent, or Firm—Jerry W. Herndon

[57] ABSTRACT

An automatic message waiting alerting arrangement in a telephone switching system. Messages for parties served by the system are automatically and manually generated and stored in a database. A message waiting indicator associated with a station is automatically activated only when the database contains an unaccessed message for the station, even though other accessed messages may be retained in the database for the convenience of the station owner. An "accessed" indicator included with each stored message is set to an "unaccessed" state when the message is initially stored. The indicator is set to an "accessed" state when the corresponding message is accessed by an authorized party. At the termination of an access session, the data base is searched for unaccessed messages for the station and the message waiting indicator is activated only if at least one unaccessed message for the station is found.

5 Claims, 10 Drawing Figures

MESSAGE WAITING ALERTING METHOD

TECHNICAL FIELD

The invention relates to telephone systems in general and, in particular, to telephone systems having message service and message waiting alerting for telephone stations.

BACKGROUND OF THE INVENTION

In the past and continuing up to the present, a common technique of providing message service for telephone users has been to utilize message answering bureaus. In some cases, all calls to a principal station are routed to an answering service where messages are manually taken. In other cases, call routing to an answering service is automatic after a prescribed number of unanswered rings at a principal station. In either event, the principal must call the answering service to obtain from an operator a recitation of messages that may have been received.

Messages are typically received by a secretary or an answering bureau in customer premises types of telephone equipment such as private branch exchanges (PBXs) or key systems. We refer herein to parties for whom messages are taken as principals and to their telephone stations or principal stations. In some cases, a message waiting (MW) lamp is provided at principal stations. Typically, such a lamp is manually activated by pushing a button at an operator's console. Alerted by activation of the MW lamp, the principal calls the appropriate party to obtain messages and then manually deactivates the MW lamp by depressing a button at the principal station.

More recently, systems are becoming available which automate the storing of callback types of messages and the activation and extinguishing of MW lamps associated with stations. This type of operation is described in a U.S. patent application Ser. No. 363,469, filed by J. L. Cottrell et al on Mar. 30, 1982 now U.S. Pat. No. 4,476,349. This system provides a feature called Leave Word Calling (LWC), which automatically generates and stores a callback message for a called principal station on demand from a caller or other party associated with a call. In addition, a message center service is alternately available in which an operator verbally receives a message and enters the message into storage from an operator terminal. In either case, the system activates an automatic message waiting (AMW) lamp at the intended principal station in response to the storage of the message. Stored messages are retrieved by the principal or other authorized party by means of special station equipment. In the referenced system, stored messages are deleted from storage only on explicit request from the message retriever and not by virtue of being merely accessed. One reason for this is to provide principals with a convenient repository for messages on which the principal does not wish to act immediately. Another reason is that there is no convenient way to guarantee that a message is actually seen by a principal merely because the message is transmitted by the system toward the special message accessing equipment. The AMW lamp at a principal station is activated when stored messages are present and is automatically extinguished by the system when there are no more messages stored in the system for the principal.

Experience with the above system has shown that, as a practical matter, AMW lamps are virtually always activated, both because of use of the message storage service by principals to retain old messages as reminders for future action and because there are several sources of message generation. Thus, the message alerting function becomes much less useful than might otherwise be expected because of the fact that AMW lamps are usually lit. Moreover, new message services are likely to be forthcoming as systems mature into even more advanced systems, thus further vitiating the usefulness of the message alerting function.

While the system disclosed in the Cottrell et al application offers significant advantages over the prior art, improvement is needed in the area of automatic message waiting alerting.

SUMMARY OF THE INVENTION

An advance in the telephonic message service art is obtained in a method in which stored messages are retained in memory until specifically deleted by a principal or other authorized party, while at the same time, automatically alerting principals of the presence of stored messages only when new unaccessed messages are present. Messages are stored in a database as they are generated, each with an identification of a principal station served by the telephone system for which the messages are intended. A message waiting indicator associated with a station is automatically activated as a result of storing a message for the principal of the station. A message is marked as accessed in the database in response to a signal generated from a station during a message retrieval operation signifying that the particular message has been accessed. At the end of the retrieval operation, the database is searched for any remaining messages for the station that are not marked as accessed. The message waiting indicator is extinguished only if no such unaccessed messages are found.

A message is deleted from the database in response to an explicit delete request generated at a station during a message retrieval operation or by a message cancel request received from an authorized station at any other time. Thus, the database may be conveniently used by the principals served by the system to retain stored messages as reminders or for other purposes without vitiating the purpose of an automatic message waiting feature.

DETAILED DESCRIPTION

Figure 1:
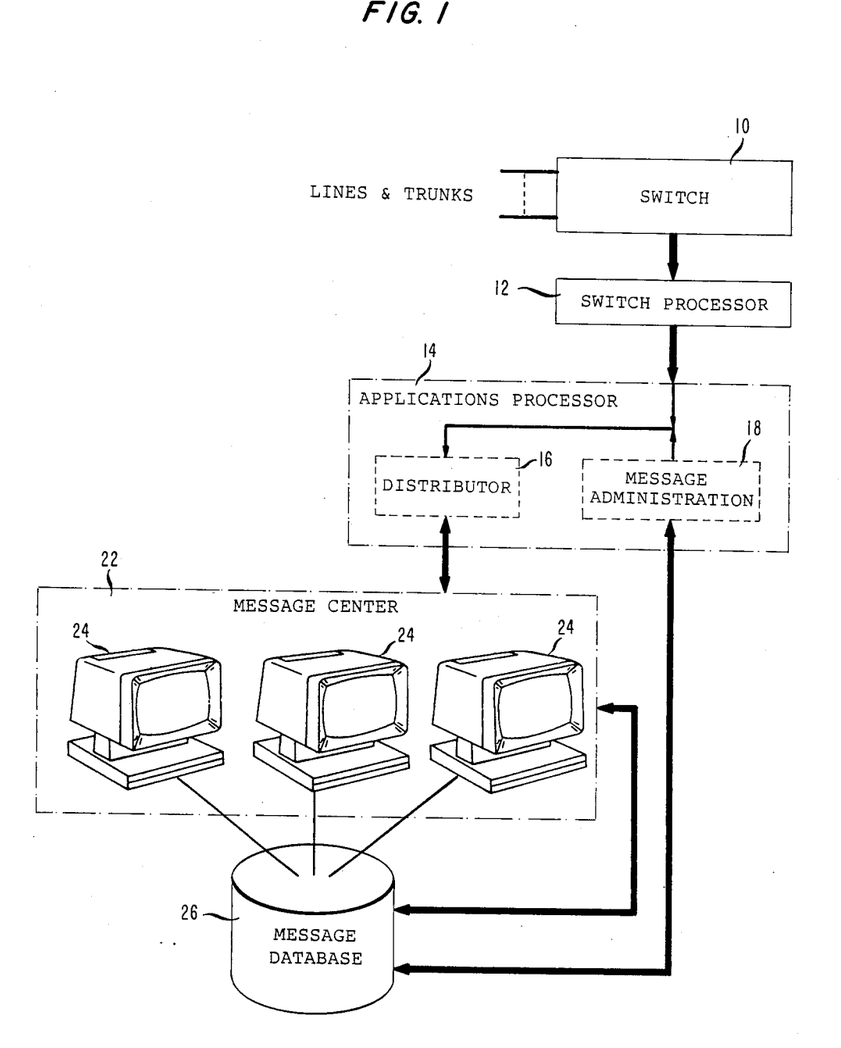
FIG. 1 shows a block diagram of an illustrative private branch exchange telephone system (PBX) used to disclose the invention.

Major functional blocks of an illustrative private branch exchange (PBX) telephone system are shown in block diagram form in FIG. 1. This is the PBX telephone system disclosed in the earlier-mentioned Cottrell et al U.S. patent application Ser. No. 363,469. The disclosure of this application is hereby incorporated into this application. Stations (not shown in FIG. 1) served by the system and incoming and outgoing trunks ultimately terminate on a switch 10 which, in turn, is controlled by a switch processor 12. The switch processor 12 communicates with an applications processor 14 which, among other things, provides processing capability for automatic and manual message generation, storage and retrieval. The dashed boxes inside of applications processor 14 represent functional processes implemented in software and performed by the processor. A distribution function 16 provides an interface with a message center 22. Operators at the message center receive calls at operator positions 24 and take messages for principals served by the system. These messages are then entered from the operator positions directly into a message center database 26. Messages may be retrieved by the operators and verbally repeated to callers.

The system of FIG. 1 also offers an automatic leave word calling (LWC) feature, whereby a caller may request the automatic generation and storage of a callback message for a principal station by activating a station button. An LWC message contains the station number of the caller and the station number of the principal for whom a message is stored. Much of the processing for this feature is performed by software implemented in the switch processor 12. This software is discussed in detail in the Cottrell et al application. Software at the applications processor 14 for interfacing with the LWC software at the switch processor 12 is included in the message administration function 18. The message administration function also includes routines used both by the message center distributor 16 and LWC function for storing messages in the message center database 26, for searching the database for messages in response to message retrieval requests from stations and for issuing automatic message waiting (AMW) lamp update commands to the switch processor 12 to perform the actual principal station AMW lamp update function.

The message administration routines are discussed in detail below. First, however, an illustrative format of a message record, which is stored in database 26 and contains the text of a message as well as related data, is discussed with reference to FIG. 2. A message, generated by an operator at a position 24 in FIG. 1 or a LWC message, is stored with an identification of the principal station number for which the message is intended in item 30 of FIG. 2. In addition, the station number of the party leaving the message and the party's name are stored in items 31 and 32, respectively. The creator identification stored in item 33 is a number identifying the process, such as LWC, that created the message. The time that a message is entered into the database is stored in item 34. In the event that a caller attempts to generate more than one LWC message for the same principal station number, a message count, stored in item 35, is incremented and a new time entered into item 34 instead of storing a separate and redundant callback message.

Figure 2:
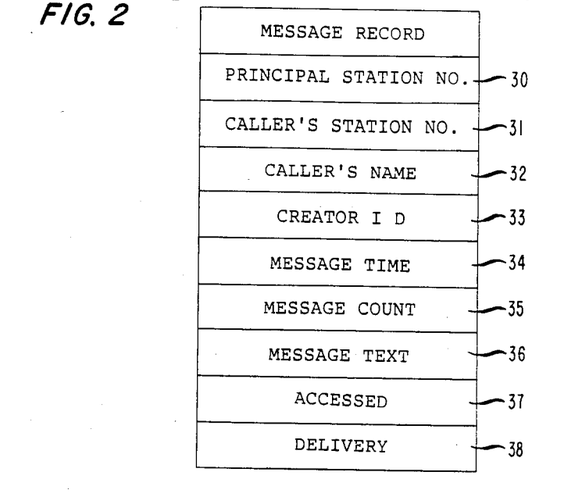
FIG. 2 shows an illustrative format of a message record used to store messages and other message related data in a database shown in FIG. 1.

The text of a message, whether it be from the message center or an automatically generated LWC message, is stored in item 36. The message accessed indicator at item 37 is initially set to an "unaccessed" state when a message is first stored. Subsequently, in response to a signal indicating that the message has actually been seen by the intended principal or other authorized party, this item is set to an "accessed" state. Similarly, in response to another signal from an authorized station, a message is placed on a delivered queue by setting item 38 to a "delivered" state. Messages in the "delivered" state are automatically removed from the database after a prescribed period of time.

Figure 3:
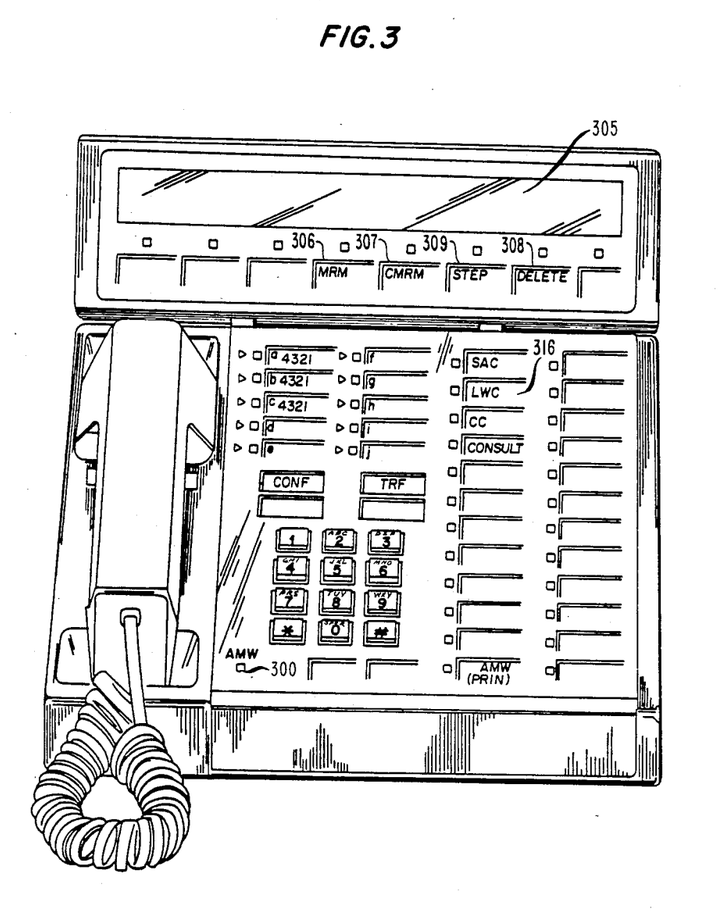
FIG. 3 shows an illustrative telephone station used to control the automatic generation and storage of messages and to display such messages.

An illustrative station used in this system to activate the generation and storage of a LWC message and the retrieval of LWC messages is shown in FIG. 3. Readers are referred to the Cottrell et al application for a detailed discussion of the station. Here, it suffices to say that the station is equipped with an AMW lamp 300 (the name designation numbers used in the Cottrell et al application are retained in FIG. 3 for convenience), an alphanumeric display 305, a series of LWC control buttons 306 through 309, and a LWC message generation request button 316. A caller may automatically cause the generation and storage of a LWC message for a called principal station by operating LWC button 316 during a call to the principal station. When an unaccessed LWC or other message is stored for the principal, the AMW lamp 300 is lit. A message retrieval mode (MRM) is activated upon the operation of the MRM button 306. The CMRM button 307 allows a secretary (for example) of a principal to retrieve messages for the principal. A message present in display 305 is deleted from database 26 in FIG. 1 only in response to an operation of the DELETE button 308. An operation of the STEP button 309 causes the message presently being displayed to be marked as "accessed" in the appropriate database 26 message record (FIG. 2).

The detailed operation of the invention will be discussed with respect to the program flowcharts in FIGS. 4 through 9, which are directed to messages generated by LWC, and to the AMW lamp update subroutine in FIG. 10. It is understood, however, that any source of message generation and storage may be integrated into the process.

Figure 4:
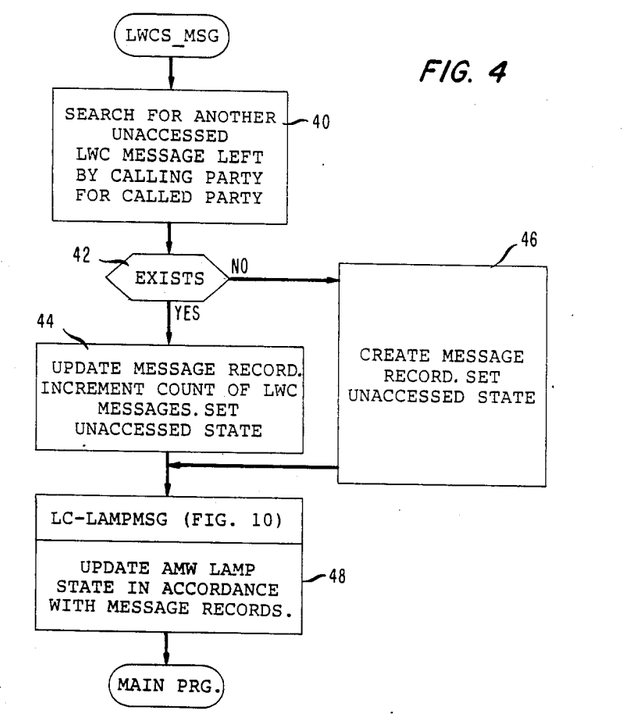
FIG. 4 shows an illustrative flowchart of a program for storing messages in the database.

The routine LWCS_MSG in FIG. 4 is entered by the main program of the applications processor 14 in response to receipt of a LWC signal from the switch processor 12. As mentioned, a LWC message contains the station number of the party requesting the generation of a LWC message, as well as the station number of the principal for whom the message is generated. Step 40 of FIG. 4 searches items 31, 33, and 37 (FIG. 2) of the message records presently stored in the database to determine if an unaccessed LWC message record is already present from this same party. For each such message found, step 40 also determines from item 30 whether the message record is for the same principal station. If an unaccessed message from the same calling station to the same principal station is located, steps 42 and 44 merely increment the message count item 35 of the record and set item 37 to an "unaccessed" state. This avoids the creation of redundant message records. On the other hand, if no message record is found having identical calling and called stations, step 46 creates a message record and stores the appropriate information in each of the record items shown in FIG. 2, including setting item 37 to the "unaccessed" state. Step 48 calls a subroutine LC_LAMPMSG to update the AMW lamp associated with the called station. This subroutine is discussed with respect to FIG. 10.

A LWC message that has been stored in database 26 may be cancelled upon request from a properly authorized station. A cancellation request is initiated from a station by dialing a prescribed cancellation access code, followed by the number of the station for which the message to be cancelled was intended. A station authorized to cancel LWC messages might be, for example, the station from which the message was generated in the first place, or perhaps a secretary of the principal of that station. This is discussed in detail in the Cottrell et al application.

Figure 5:
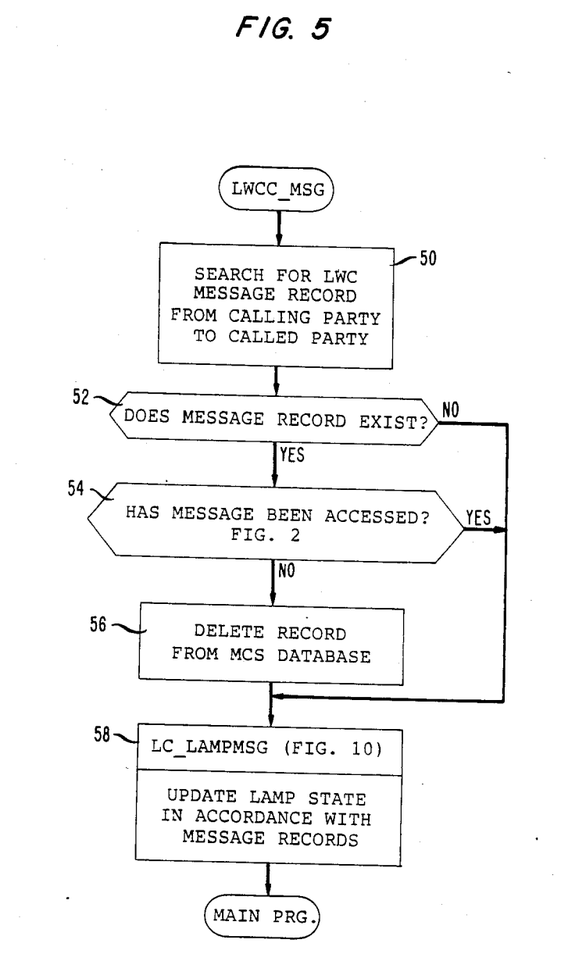
FIG. 5 shows an illustrative flowchart of a program for cancelling messages stored in the database.

Program LWCC_MSG in FIG. 5 is entered in response to a cancel message received at the applications processor 14 from the switch processor 12. A cancel message contains both the numbers of the station requesting the cancellation and the station for which a message was intended. Step 50 searches the database for a message record containing both of these numbers in items 31 and 30, respectively. If such a message record exists (step 52), step 54 determines from item 37 whether or not the associated message in item 36 has been "accessed." If so, there is no further action to be taken with respect to the "cancel" request. Assuming, however, that the associated message has not been accessed, step 56 removes the record from the database. In any event, step 58 calls subroutine LC_LAMPMSG as a last step of the "cancel" program to update the AMW lamp associated with the principal station. The AMW lamp will be extinguished unless at least one message record is found in database 26 which is in an "unaccessed" state as indicated by item 37 of the message record.

Figure 6:
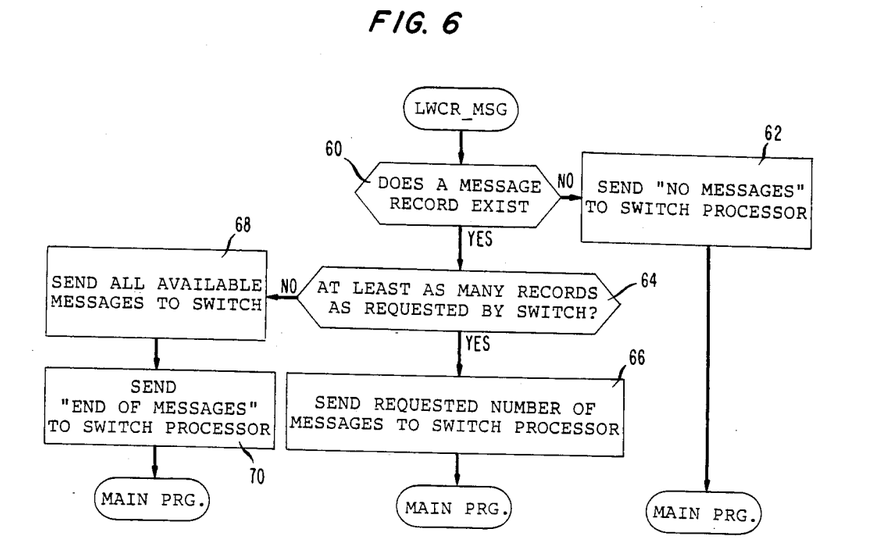
FIG. 6 shows an illustrative flowchart of a program for retrieving messages from the database.

Program LWCR_MSG in FIG. 6 is entered by the applications processor 14 on receipt of a message retrieval request from the switch processor 12. A message retrieval request includes a field specifying the number of messages, up to three, that are to be transmitted to the switch processor 12 at the same time, if they exist. The switch processor 12 transmits all the messages received from the applications processor 14 to the requesting station. The first such message is displayed at the requesting station by alphanumeric display 305 (FIG. 3) and the remaining messages, if any, are stored in memory at the requesting station for later display, as described in the Cottrell et al application.

Step 60 searches database 26 for message records containing the principal station number received in the message retrieval request stored in item 30. If no such records exists, step 62 returns a "no messages" response to the switch processor 12 and exits to the main applications processor program. Otherwise, step 64 counts the number of records found that match the search criteria. Up to three separate messages, if they exist, are transmitted to the switch processor in response to each retrieval signal as indicated above. As an aside, the transmittal of multiple messages simultaneously to a requesting station is one reason, although not the only reason, why there is no guarantee that the retriever actually sees a message that has been transmitted to a station. For example, the retriever may elect to terminate the retrieval session while a message is in the local station buffer.

Step 66 transmits up to the number of messages indicated in the retrieval request to switch processor 12 and then exits to await a further command from the switch processor. Step 68 transmits the messages that are found if the number of messages is less than the number requested in the retrieval request. This is followed by a "end of message" signal at step 70.

Figure 7:
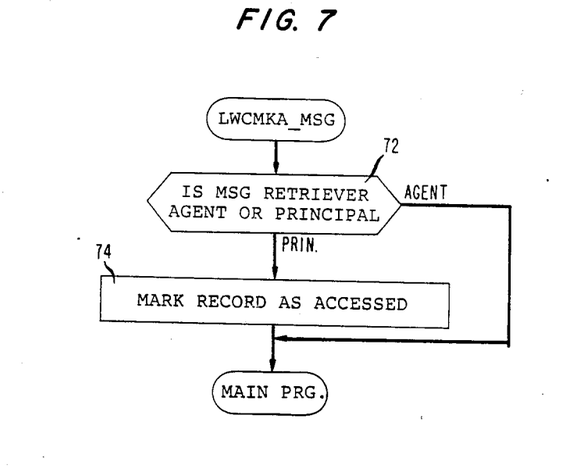
FIG. 7 shows an illustrative flowchart of a program for marking messages stored in the database as accessed.

During a message retrieval session, program LWCMKA_MSG in FIG. 7 is entered by the applications processor 14 in response to a message "accessed" signal received from the switch processor 12. A party retrieving messages at a display set depresses the STEP button 309 to request a display of the next message, if any. This message might come from the station buffer if the buffer is not yet empty. If the buffer is empty, the "STEP" request results in a new retrieval request being sent to the applications processor. Before the improvement disclosed herein, the switch processor 12 responded to a "STEP" command as shown in FIG. 35 of the Cottrell et al application. Two principal program steps, steps 3501 and 3502, are shown in that figure. Step 3501 sent a message to an interface program at switch processor 12 which, in turn, requested, the applications processor 14 to transmit the next single message stored for the principal station to the switch processor for display at the retrieving station. The next step 3502 caused the next message stored in the buffer of the display set to be displayed to the retriever. As a result of the present invention, step 3501 of the Cottrell et al application is modified so that the request to the applications processor 14 for the next stored message is also accompanied by an "accessed" signal and a signal indicating whether retrieval is being performed by an agent of the principal or from the principal station itself. This message from the switch processor 12 causes entry to program LWCMKA_MSG in FIG. 7 of the present invention. Step 72 of LWCMKA_MSG determines from the received message if message retrieval is being performed at the principal station, rather than by an agent. If so, step 74 of FIG. 7 marks item 37 of the message record just displayed as "accessed." This step is omitted if retrieval is being performed at an agent's station. The applications processor 14 maintains a history of the messages that have been transmitted to the switch processor 12 for display to allow it to identify the message record to be marked as "accessed" in step 74. The identification is possible because of the sequential nature of the display process at the switch processor.

Figure 8:
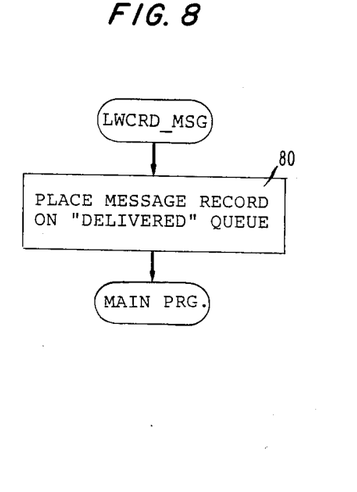
FIG. 8 shows an illustrative flowchart of a program for processing a signal from a station signifying an end of a message retrieval operation.
Figure 9:
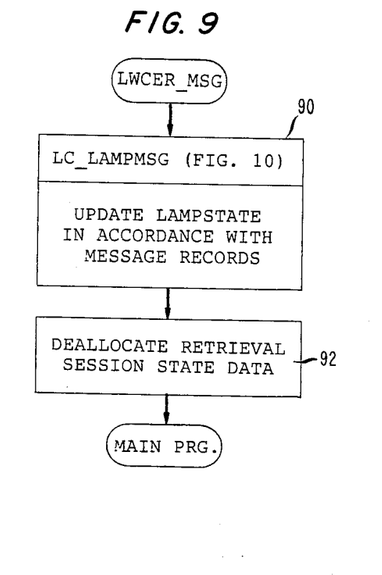
FIG. 9 shows an illustrative flowchart of a program for deleting a message in the database during a message retrieval operation.

Program LWCRD_MSG in FIG. 8 is entered by the applications processor 14 in response to a "delete" message from the switch processor 12. A "delete" message is generated in response to a depression of the DELETE key at a message retrieving station. Step 80 of program LWCRD_MSG in FIG. 8 identifies the message record in question that is requested to be deleted and marks item 38 of the record in FIG. 2 as "delivered". The effect of this action is to remove the message record from the records that may be accessed by a message retriever in an ordinary retrieval mode. Records marked as delivered are routinely erased from the database at predetermined times. During the period between marking a message as delivered and erasing the message from database 26, such messages may be accessed by extraordinary means which are not pertinent to this invention.

A message retrieval session is terminated by a reoperation of the MRM or CMRM buttons at a display station. A resulting message from the switch processor 12 to applications processor 14 causes entry to program LWCER_MSG in FIG. 9 at the applications processor. Step 90 of LWCER_MSG calls subroutine LC_LAMPMSG to update the AMW lamp associated with the principal station. Step 92 initializes the necessary memory locations at the applications processor to terminate the message retrieval session.

Figure 10:
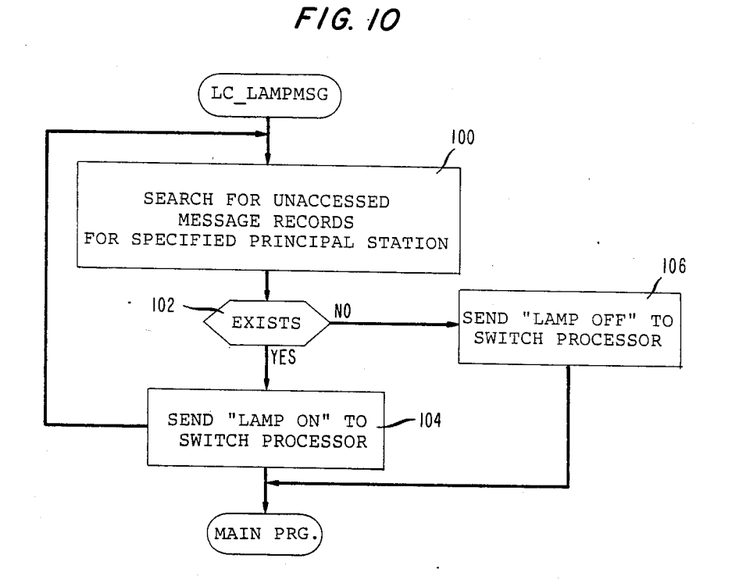
FIG. 10 shows an illustrative flowchart of a subroutine used to update the status of message waiting indicators associated with the stations served by the illustrative PBX.

The AMW lamp update subroutine LC_LAMPMSG is shown in FIG. 10. Step 100 searches items 30 and 37 of the message records in database 26 for records stored for a specified principal station which are marked as "unaccessed." If any such record exists, steps 102 and 104 send a AMW lamp ON request to switch processor 12 with the number of the station whose lamp is to be updated. Otherwise, step 106 sends a lamp OFF message to the switch processor. In either event, switch processor 12 updates the appropriate AMW lamp as discussed with respect to FIG. 30 of the Cottrell et al application.

It is to be understood that the above-described arrangement is merely illustrative of the application of the principles of the invention and that other arrangements may be devised by those skilled in the art without departing from the spirit and scope of the invention.

What is claimed is:

1. A method of providing automatic message waiting alerting for principals of stations served by a telephone system, in which the system contains arrangements for allowing the generation of messages intended for ones of the stations by other ones of the stations, message waiting indicators associated with each of the stations and a database, said method comprising the steps of storing messages, including identities of the stations for which the messages are intended, in the database in response to generation of the messages, activating the message waiting indicators associated with the stations for which messages are stored, marking a said message in the database as accessed in response to an accessed signal by an authorized party during a message retrieval operation for a principal one of the stations, searching the database at the end of the retrieval operation, and extinguishing the message waiting indicator associated with said one principal station in response to the last-mentioned searching step if all messages in the database intended for said one station are marked as accessed.

2. The invention of claim 1 further comprising the step of deactivating the message waiting indicator associated with said one principal station in response to the searching step when there are no messages in the database intended for said one principal station.

3. The invention of claim 1 further comprising the step of deleting an accessed message from the database in response to a delete signal received from the retrieving station during a message retrieval operation.

4. The invention of claim 1 further comprising the steps of deleting a message from the database in response to a message cancel request from an authorized station containing the identifications of the principal station for which the message is intended and the station responsible for generating the message, searching the database after the last mentioned deleting step, and deactivating the message waiting indicator associated with the principal station in response to the last-mentioned searching step if all messages in the database intended for the principal station are marked as accessed or if there are no messages in the database intended for the principal station.

5. A method of providing automatic message waiting alerting for stations served by a telephone system, in which the system contains message waiting indicators associated with each of the stations, an applications processor for controlling the storage of messages for the stations and a database for storing the messages, said method comprising the steps of storing a message record in the database in response to receipt of a message for a principal one of the stations, said record containing an identification of the principal station and the text of the message, setting a message accessed indicator in the message record to a message unaccessed state, activating the message waiting indicator associated with the principal station, searching the database for message records stored for the principal station in response to receipt of a request from an authorized one of the stations to access messages stored for the principal station, transmitting the message text in a message record found for the principal station to the requesting station, setting the accessed indicator in the found message record to an accessed state in response to a message accessed signal from the requesting station, searching the database for message records stored for the principal station in response to a message retrieval end signal from the message requesting station, and extinguishing the message waiting indicator associated with the principal station in response to the last-mentioned searching step if no message record is found having the accessed indicator set to an unaccessed state.

* * * * *

REEXAMINATION CERTIFICATE (3984th)

United States Patent [19]
Myslinski et al.

[11] B1 4,582,959
[45] Certificate Issued Feb. 1, 2000

[54] MESSAGE WAITING ALERTING METHOD

[75] Inventors: Theodore A. Myslinski, Freehold, N.J.; Paul L. Richman, Boulder, Colo.

[73] Assignee: AT&T Information Systems, Inc., Holmdel, N.J.

Reexamination Request:
No. 90/005,304, Mar. 25, 1999

Reexamination Certificate for:
Patent No.: 4,582,959
Issued: Apr. 15, 1986
Appl. No.: 06/617,325
Filed: Jun. 5, 1984

[51] Int. Cl.[7] .................................................. H04M 3/50
[52] U.S. Cl. .................................. 379/88.12; 379/93.14; 379/376
[58] Field of Search ................................ 379/67.1, 88.12, 379/376, 93.14

[56] References Cited

FOREIGN PATENT DOCUMENTS 3234081  9/1982  Germany .................. H04M 3/50

OTHER PUBLICATIONS

J.D. Gould et al., "Speed Filing—An Office System for Principals", IBM Systems Journal, vol. 23, No. 1 (1984), pp. 65–81.

Kn. "Sprachbriefkasten", *Funkschau*, No. 4 (Feb. 1983) pp. 53–54.

*Primary Examiner*—F Tsang

[57] ABSTRACT

An automatic message waiting altering arrangement in a telephone switching system. Messages for parties served by the system are automatically and manually generated and stored in a database. A message waiting indicator associated with a station is automatically activated only when the database contains an unaccessed message for the station, even though other accessed messages may be retained in the database for the convenience of the station owner. An "accessed" indicator included with each stored message is set to an "unaccessed" state when the message is initially stored. The indicator is set to an "accessed" state when the corresponding message is accessed by an authorized party. At the termination of an access session, the data base is searched for unaccessed messages for the station and the message waiting indicator is activated only if at least one unaccessed message for the station is found.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–5 is confirmed.

* * * * *